May 19, 1970      D. C. CHANG ETAL      3,512,865
D-C FREE ELECTRO-OPTIC CRYSTAL SYSTEM
Filed Jan. 15, 1968
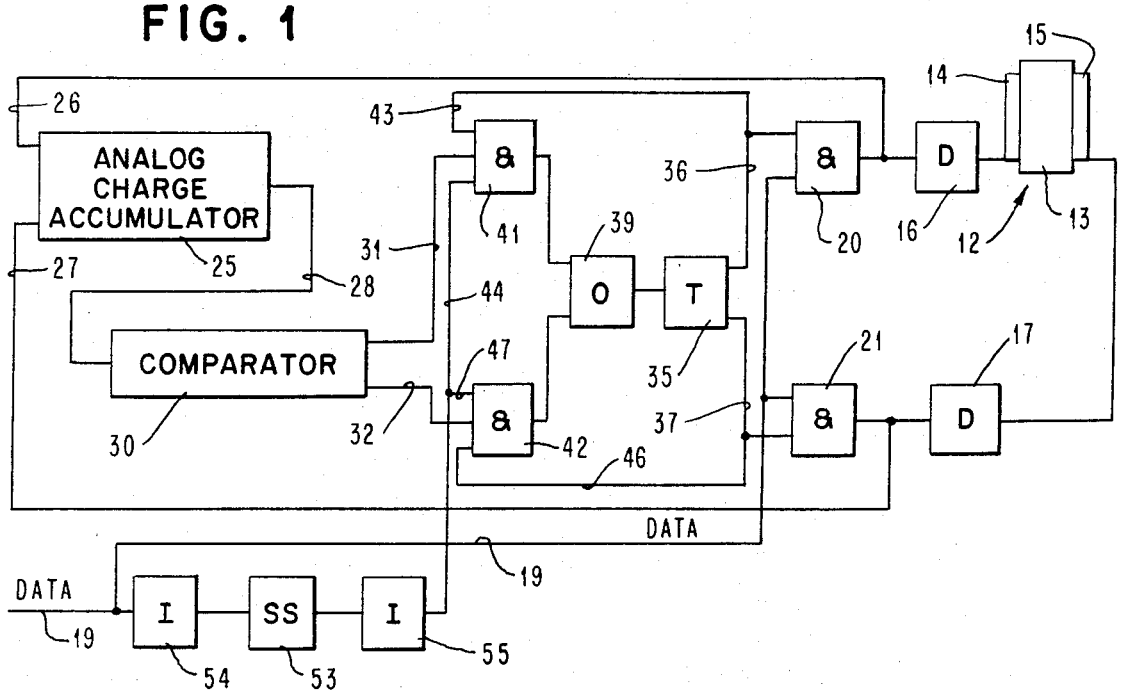
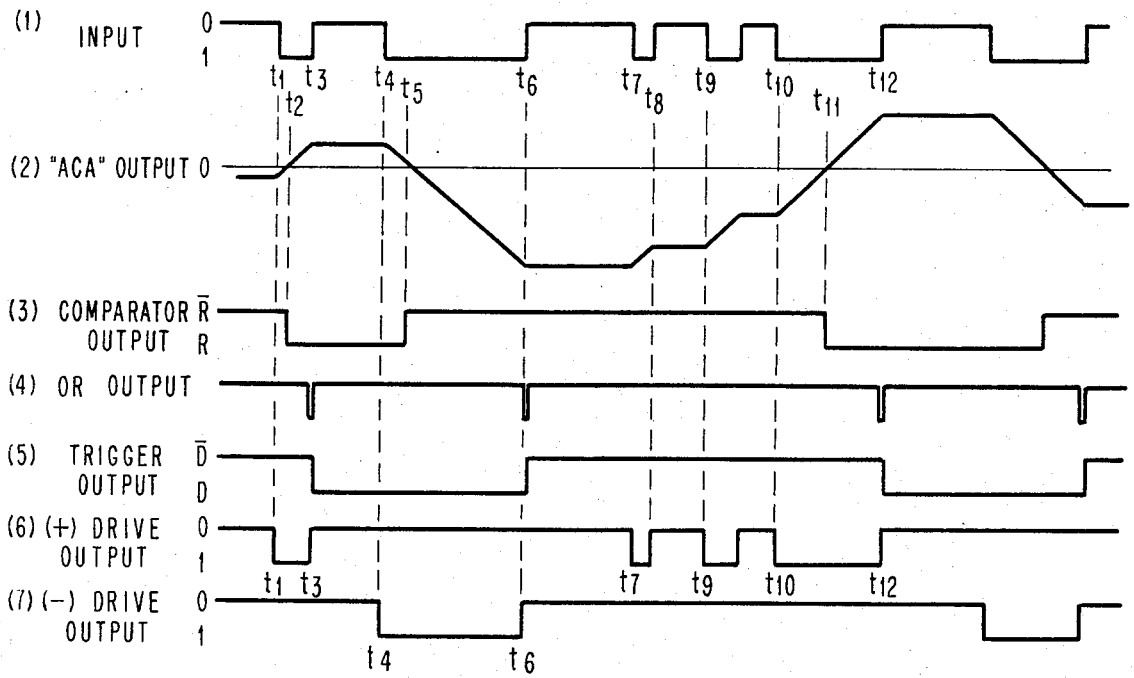
INVENTORS
DAVID C CHANG
JAMES LIPP
ATTORNEY

3,512,865
D-C FREE ELECTRO-OPTIC CRYSTAL SYSTEM
David C. Chang, Pleasant Valley, and James Lipp, Poughkeepsie, N.Y., assignors to International Business Machines Corporation, Armonk, N.Y., a corporation of New York
Filed Jan. 15, 1968, Ser. No. 697,680
Int. Cl. H03k *19/14;* G02f *3/00*
U.S. Cl. 350—150          8 Claims

ABSTRACT OF THE DISCLOSURE

This invention is based in part on the discovery that electrolysis of an electro-optic crystal can be caused by an accumulation of the electrical charge on the crystal that occurs when the crystal is operated predominantly in one polarity. This invention provides a circuit that varies the polarity of the voltage applied to the crystal in a direction to oppose the accumulation of charge on the crystal. The circuit includes two drivers for operating the crystal in one polarity or the other in response to data signals, a trigger circuit that is operable to select one of the two drivers and to signify which of the drivers is being selected, circuitry that responds to the driver conduction state to simulate the charge on the electro-optic crystal, and circuitry that is operable in the intervals between the times a voltage is applied to a crystal to compare the polarity of the simulated charge with the polarity of the selected driver to operate the latch to select a different driver when the simulated charge has the same polarity as the voltage being applied to the crystal by the operating driver.

Introduction

An electro-optic crystal is a device that rotates the plane of polarization of light. The crystal is provided with a pair of electrodes that are connected to a source of high voltage that is varied according to an input signal. Light that is transmitted through the electrodes and the crystal has its plane of polarization rotated according to the polarity and amplitude of the voltage.

An electro-optic crystal is often combined with a birefringent crystal to form a digital light deflector. A birefringent crystal has two different indexes of refraction to light of different polarization. Thus a birefringent crystal transmits differently polarized components of ordinary light along two paths. In a digital light deflector, the electro-optic crystal controls the polarization of the light to take only one or the other of the two paths through the birefringent crystal.

Voltages on the order of a few thousand volts are required to operate an electro-optic crystal. This high voltage seriously shortens the operating life of a crystal and it produces a breakdown that is called electrolysis. An object of this invention is to provide a new and improved electro-optic system in which the electrolysis problem is overcome.

The invention

We have found that the electrolysis problem is associated with the electrical charge that can accumulate on the crystal when the crystal is electrically pulsed repeatedly in one polarity. For example, the crystal can be operated with zero voltage across the electrodes to represent a binary zero and with a predetermined voltage across the electrodes to represent a binary one. The two electrodes and the separating dielectric of the crystal body give an electro-optic crystal approximately the electrical characteristics of a capacitor. Thus, repeated pulsing in one polarity gradually charges the capacitance of the crystal to a significantly high voltage.

This invention provides a circuit that changes the polarity of the voltage applied to the crystal in a way that opposes the charge on the crystal. For example, a binary zero is represented by ground potential on both electrodes and a binary one is represented by ground potential on one electrode and a predetermined positive potential on the other electrode. When the charge on the crystal has risen to a predetermined value, the previously grounded terminal is connected to receive positive pulses and the other terminal is grounded. This operation begins to discharge the crystal.

The drivers provide voltage levels to rotate the plane of polarization in either direction to positions that are 180 degrees apart so that the polarities are equivalent to the birefringent crystal. With conventional birefringent crystals, the plane of polarization representing a binary one is 90 degrees from the plane representing a binary zero. In such a system, equal voltage amplitudes represent a binary one in the two polarities.

The specific system that will be described in detail includes a pair of high voltage drivers that are each operable to apply one of two voltages to an associated electrode of an electro-optic crystal. One or the other of the drivers is controlled to maintain a reference potential on its electrode, and the other driver is controlled according to a data input to give its electrode either the reference voltage to represent a binary zero or a predetermined voltage and polarity to represent a binary one.

A bistable trigger circuit is arranged to select one or the other of the two drivers to be responsive to the data signals. The charge on the crystal is detected and the trigger is switched when the charge has accumulated to a threshold level.

For detecting the charge, the system includes an electrical circuit called an analog charge accumulator that has the charging characteristics of the electro-optic crystal. This circuit is connected to receive the signals applied to the input terminals of the two drivers to be charged or discharged at a low voltage when a driver is turned on. Thus the output voltage of the analog charge accumulator represents the voltage of a designated electrode with respect to the other. (It will be convenient to refer to the two drivers as a positive driver and a negative driver because of this relationship to the output of the analog accumulator.) This output is connected to a comparator circuit that produces two binary logic signals that signify whether the charge has become more positive than a positive threshold or has become more negative than a negative threshold.

The comparator outputs are combined logically with the two trigger outputs to signify when a driver has discharged the crystal sufficiently to change the polarity and then to charge the crystal above the threshold. For example, if the trigger has selected the positive driver and the charge is above the positive threshold, the negative driver should be selected. A timing signal is generated to signify that neither driver is on, and at these times the trigger can be switched to select the other driver.

The foregoing and other objects, features and advantages of the invention will be apparent from the following more particular description of a preferred embodiment of the invention, as illustrated in the accompanying drawings.

The drawings

FIG. 1 is a schematic of the preferred embodiment of the invention.

FIG. 2 shows a series of waveforms illustrating the operation of the circuit of FIG. 1.

The preferred system

*Introduction.*—The electro-optic crystal 12 has a crystal body 13 of known suitable material and a pair of transparent electrodes 14 and 15. Crystal 12 is oriented in an optical system to control a beam of light that is transmitted through the electrodes and the crystal body. Electrode 14 is connected to the output terminal of a driver 16 and electrode 15 is connected to the output terminal of a driver 17. Driver 16 will be called a positive driver and driver 17 will be called a negative driver in parts of this description. Each driver is arranged to produce at its output one of two voltage levels. For example, a driver can maintain its output terminal at either a high positive voltage or ground. When both drivers produce the same polarity and amplitude, the voltage across the crystal is zero. When one driver produces a positive output and the other produces a ground level output, a voltage of predetermined amplitude appears across the electrodes 14 and 15. The voltage applied to the electrodes has an amplitude such that the rotation of the plane of polarization of the light through the crystal body 13 is the same for either polarity of the voltage applied to the electrodes.

The circuit receives an input representing data on a line 19. The data signal is applied to inputs of two AND gates 20 and 21. By control inputs described later, one or the other of the two AND gates is enabled to transmit the data signals on line 19 to the corresponding one of the two drivers.

Waveforms (1), (6), and (7) in FIG. 2 illustrates the operation of the components that have been described so far. Before time T1 the data is a logical 0 and both drivers produce 0 level outputs. At time $t1$ the data is a logical 1 and the positive driver 16 is switched to a 1 output to produce a voltage across the electrodes 14 and 15. At time $t3$ the data is zero and the driver 16 is returned to its 0 output state to produce zero voltage across the electrodes. At time $t4$ the data is a logical 1 and the driver 17 is switched to its 1 output state to produce a voltage across the electrodes. This operation is conventional except for the fact that the polarity of the voltage across the electrodes is varied; the circuits that provide this feature of the operation will be described next.

*Polarity sensing circuits.*—An analog charge accumulator 25 is arranged to be charged from the low voltage outputs of AND circuits 20, 21 in the same way that the crystal is charged at the outputs of drivers 16, 17. Analog charge accumulator 25 has one input terminal 26 connected to the output terminal of AND gate 20 and a second input terminal 27 connected to the output terminal of AND gate 21. At its output 28, it produces a voltage that varies in amplitude and polarity according to the voltage at electrode 14 with respect to electrode 15. The analog charge accumulator is constructed to be a circuit analog of the electrical characteristics of the crystal 12. Thus the analog charge accumulator comprises a capacitance and suitable circuits for charging the capacitance in response to the output of gates 20, 21.

In FIG. 2, waveforms (2), (6), and (7) illustrate the operation of the analog charge accumulator. Before time $t1$, both drivers are off and the analog charge accumulator has a small negative output voltage from a preceding operation. At time $t1$ when AND gate 20 and the driver 16 are turned on to make electrode 14 positive with respect to electrode 15, the output of AND gate 20 appears at input 26 of the analog charge accumulator and begins driving the output 28 of the analog charge accumulator positive. At time $t3$, AND gate 20 and driver 16 are turned off and the output voltage of the analog charge accumulator remains at approximately its existing level. In the operation that begins at time $t4$, AND gate 21 and the driver 17 are turned on and similarly drive the output of the analog charge accumulator negative.

A comparator circuit 30 receives the amplitude varying output voltage on line 28 and produces at its outputs 31 and 32 binary signals that signify the residual charge on the crystal. In FIG. 2 the waveform (3) shows the output at comparator terminal 31. Before time $t1$, the comparator output 31 is at the zero logic level (designated $\bar{R}$) corresponding to the previously established negative voltage level at output 28 of the analog charge accumulator. At time $t2$ when analog voltage has become 0, the comparator switches its output on line 31 to the one logic level, designated R in FIG. 2. The output at terminal 32 is the complement of the waveform (3). Thus, comparator 30 is made up of a conventional bistable circuit having its set input connected to receive positive polarity voltages on line 28 and having its reset input connected to receive negative voltages on line 28. The comparator preferably includes a threshold device at its input to prevent the circuit from responding to voltages below the threshold.

*Sampling and control circuits.*—A trigger circuit 35 has its two complementary outputs 36 and 37 connected to provide the enabling signals to AND gates 20 and 21. In FIG. 2 waveform (5) shows the output of the trigger. The level designated $\bar{D}$ selects AND circuit 20 and the positive driver 16; the level D selects AND circuit 21 and the negative driver 17. Trigger 35 has its input connected to receive a pulse whenever the crystal has been charged to the polarity of the selected driver. An OR circuit 39 and two AND circuits cooperate to provide this logic function.

AND circuit 41 has one input terminal connected to receive the output 31 of the comparator 30, a second input 43 connected to output 36 of trigger 35, and an input 44 connected to receive a timing signal (which is provided by circuits that will be described later). The input on line 43 signifies that the trigger is in a state to select driver 16 to charge electrode 14 in a positive direction. The input 31 from the comparator signifies that the charge on the crystal is positive. Thus the coincidence of signals on inputs 31 and 43 signifies that further operation with the existing trigger state will increase the charge beyond the level set by the threshold.

AND gate 42 receives the input 32 from the comparator, an input 46 from the output 37 of trigger 35, and a timing input 47; the operation of AND gate 42 is similar to the operation of AND gate 41. The OR circuit 39 combines the outputs of AND gates 41 and 42 and applies pulses to trigger circuit 35.

The operation of the trigger is timed to occur when the voltage across the drivers is zero. A single shot circuit 53 and two inverters 54 and 55 cooperate to produce a timing pulse on lines 44 and 47 at the end of a 1 signifying data input. The single shot is designed to produce a pulse of a suitable width to operate trigger 35. Inverter 54 inverts the level of the data pulses to cause single shot 53 to respond to the trailing edge of a 1 data pulse. The inverter 55 inverts the output of the single shot to a polarity to operate the AND gates 41 and 42.

*Summary of operation.*—In FIG. 2, waveform (1) shows an arbitrary pattern of 1 and 0 levels that appear in the data at input 19. Waveform 2 shows the charge on the crystal 12 (measured from electrode 14 to electrode 15) as this charge is simulated at output terminal 28 of the analog charge accumulator. The charge increases (or decreases) while the data is at a 1 level, and it remains approximately constant while the data is at a 0 level. Without the control of this invention, the crystal would charge progressively in one polarity. As waveform (2) shows, the charge is controlled to vary about zero.

Waveform (3) is a binary signal that corresponds to the polarity of the charge on the crystal shown in waveform (2). At times $t2$, $t5$, and $t11$ the charge polarity changes and the comparator output of waveform (3) changes from one binary state to the other.

The OR output pulses of waveform (4) are generated at times to change the polarity of the drivers operating the crystal. The pulses of waveform (4) follow each change in the level of the comparator output. Thus, the OR output at time t3 results from the comparator change at time t2, and the output at time t6 results from the comparator change at time t5. Waveform (4) is also related to the trailing edges of the data input of waveform (1) by the timing circuits formed by components 53, 54, and 55. Waveform (5), the trigger output, is directly related to the OR output of waveform (4) since the trigger switches in response to the OR output pulses.

Waveforms (6) and (7) if superimposed are identical to the data input of waveform (1); the separation between waveforms (6) and (7) corresponds to the trigger output of waveform (5).

A more detailed explanation of the operation of the individual components is presented in the description of the components of the circuit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for controlling the voltage on a pair of electrodes of an electro-optic crystal in response to an input signal, comprising:
    driver means having outputs connected to said electrodes and responsive to said input signal to apply voltages across the electrodes in an amplitude that corresponds to said input signal and in a selectable polarity that is independent of said signal, whereby said crystal tends to charge in the selected polarity, and
    means responsive to a predetermined accumulation of charge on said crystal and connected to control said driver means for varying said polarity at intervals that correspond to said response to said predetermined accumulation of charge on said crystal.

2. A system according to claim 1 in which said means for varying said polarity comprises:
    means providing a measure of the voltage across said electrodes, and
    means responsive to said measure of the voltage across said electrodes to control said drivers to operate in a polarity opposing the polarity of charge on said crystal.

3. A system according to claim 1 in which said drivers include means to apply binary valued voltages to said electrodes in each of said polarities.

4. A system according to claim 3 in which said drivers include means to provide a reference voltage across said electrodes representing one binary value and to provide a predetermined amplitude in said preset polarity with respect to said reference to represent the other binary value.

5. A system for controlling the voltage on a pair of electrodes of an electro-optic crystal according to an input signal comprising:
    a first driver having an output connected to one of said electrodes and controllable to turn on or off to apply either one of two potentials to its electrode, and a second driver having an output connected to the other of said electrodes and controllable to turn on or off to apply either one of said two potentials to its electrode, whereby said electrodes can be given zero potential difference or a predetermined potential difference in either polarity according to the combination of operating states of said first and second drivers,
    a bistable circuit, having two complementary outputs,
    logic circuit means connected to be responsive to the outputs of said bistable circuit to control one of said drivers to maintain a predetermined one of said potentials on its electrode independent of said input signal and to control the other of said drivers to be responsive to said signal to switch its electrode between said two potentials according to said input signal, whereby said crystal tends to be charged in one polarity or the other according to the state of said bistable circuit, and
    means connected to switch said bistable circuit between its two stable states at intervals corresponding to a predetermined accumulation of charge on said crystal to control said drivers to oppose an accumulation of charge on said crystal.

6. A system according to claim 5 in which said means connected to switch said bistable circuit comprises:
    means providing a measure of the voltage across said electrodes, and
    means responsive to the polarity of said measure of the voltage across said electrodes and responsive to the state of said bistable circuit to change the state of said bistable circuit when the polarity of the charge on the crystal is the same as the polarity applied to the electrodes by said drivers.

7. A system according to claim 6 in which said means providing a measure of the voltage across said electrodes comprises:
    logic circuits connected to be responsive to the state of said bistable circuit and to said input signal and connected to produce low level binary signals controlling said drivers, and
    a charge accumulator circuit connected to receive said low level binary signals and to be charged at a low voltage as said crystal is charged at a high voltage and to produce an output according to the charge on said crystal.

8. A system for controlling an electro-optic crystal having a pair of electrodes in response to an input signal, comprising:
    a first driver having an output connected to one of said electrodes and controllable to turn on or off to apply one of two potentials to its electrode, and a second driver having an output connected to the other of said electrodes and controllable to turn on or off to apply one of said two potentials to its electrode, whereby said electrodes can be given zero potential difference or a predetermined potential difference in either polarity according to the combination of operating states of said first and second drivers,
    a bistable circuit having a pair of complementary outputs,
    logic circuits connected to be responsive to the state of said bistable circuit and to said input signal and connected to produce low level binary signals controlling said drivers to produce a voltage across said electrodes according to said data signals and in a polarity according to the state of said bistable circuit, whereby the state of said bistable circuit establishes the direction of charging of said electro-optic crystal,
    an analog charge accumulator connected to receive said low level binary signals from said logic circuits and to accumulate charge as said crystal accumulates charge and to produce an analog output varying according to the charge on said crystal,
    means connected to receive said analog output and to convert said analog voltage to a binary signal representing the polarity of charge on said crystal,
    means connected to provide a pulse signifying that the drivers are in a state to apply zero voltage across said electrodes, and
    means responsive to said binary signal representing the polarity of charge on said crystal, to said pulse signifying that the drivers are in a state to apply zero voltage across said electrodes, and to the state of said bistable circuit to change the state of said bistable circuit when the charge on the crystal has the polarity of voltages being applied to the electrodes.

References Cited
UNITED STATES PATENTS

| | | | |
|---|---|---|---|
| 2,936,380 | 5/1960 | Anderson | 350—150 |
| 3,284,785 | 11/1966 | Kornei | 350—151 |
| 2,319,289 | 5/1943 | Becker. | |
| 3,443,857 | 5/1969 | Warter. | |

FOREIGN PATENTS 690,467  4/1953  Great Britain.

DAVID SCHONBERG, Primary Examiner

P. R. MILLER, Assistant Examiner

U.S. Cl. X.R.

307—203; 328—92; 350—149, 151, 321